United States Patent [19]

Harrison

[11] Patent Number: 4,816,043

[45] Date of Patent: Mar. 28, 1989

[54] ADSORPTION-DESORPTION FLUID FRACTIONATION WITH CYCLE PHASE SWITCHING CONTROLLED BY PURGE AND SATURATION FRONT CONDITIONS

[75] Inventor: Stanley N. Harrison, Parker, Colo.

[73] Assignee: Wilkerson Coporation, Englewood, Colo.

[21] Appl. No.: 739,628

[22] Filed: May 31, 1985

[51] Int. Cl.⁴ .............................................. B01D 53/04
[52] U.S. Cl. ....................................... 55/162; 55/163; 55/179; 55/271; 55/275
[58] Field of Search ................. 55/20, 33, 162, 163, 55/179, 271, 274, 275

[56] References Cited

U.S. PATENT DOCUMENTS

| | | | |
|---|---|---|---|
| 2,535,902 | 12/1950 | Dailey, Jr. | 55/33 |
| 2,561,441 | 7/1951 | Lou | 55/33 X |
| 3,359,706 | 12/1967 | Zonkey | 55/20 |
| 3,448,561 | 6/1969 | Seibert et al. | 55/275 X |
| 4,197,095 | 4/1980 | White, Jr. et al. | 55/163 X |
| 4,205,967 | 6/1980 | Sandman et al. | 55/33 X |
| 4,324,564 | 4/1982 | Oliker | 55/20 |
| 4,351,649 | 9/1982 | Owens et al. | 55/163 X |
| 4,468,236 | 8/1984 | Bauer | 55/20 |
| 4,504,286 | 3/1985 | Carlisle et al. | 55/20 |

FOREIGN PATENT DOCUMENTS

| | | | |
|---|---|---|---|
| 88905 | 9/1983 | European Pat. Off. | 55/33 |
| 129520 | 1/1978 | German Democratic Rep. | 55/20 |
| 590003 | 1/1978 | U.S.S.R. | 55/163 |
| 929179 | 5/1982 | U.S.S.R. | 55/20 |

Primary Examiner—Robert Spitzer
Attorney, Agent, or Firm—Ralph F. Crandell

[57] ABSTRACT

The saturation front in each dessicant bed of a twin tower fractionating apparatus is located by sensizing a temperature gradient associated with the advancing saturation front. A pair of temperature sensors operatively sense the temperature in front of and behind the saturation front to provide a saturation front signal. The saturation front signal operatively controls the cycling of the inlet fluid mixture between the two dessicant beds of the fractionating apparatus. By sensing the location of the saturation front before it breaks through the dessicant bed, cycling occurs before each bed becomes fully saturated, but the substantial capacity of the dessicant bed is utilized to prolong the lifetime of the dessicant and to more effectively utilize energy by eliminating excessive waste purge gas. A maximum extend time period is provided for cycling the inlet flow mixture when a saturation front signal is not supplied under low flow rate conditions.

5 Claims, 3 Drawing Sheets

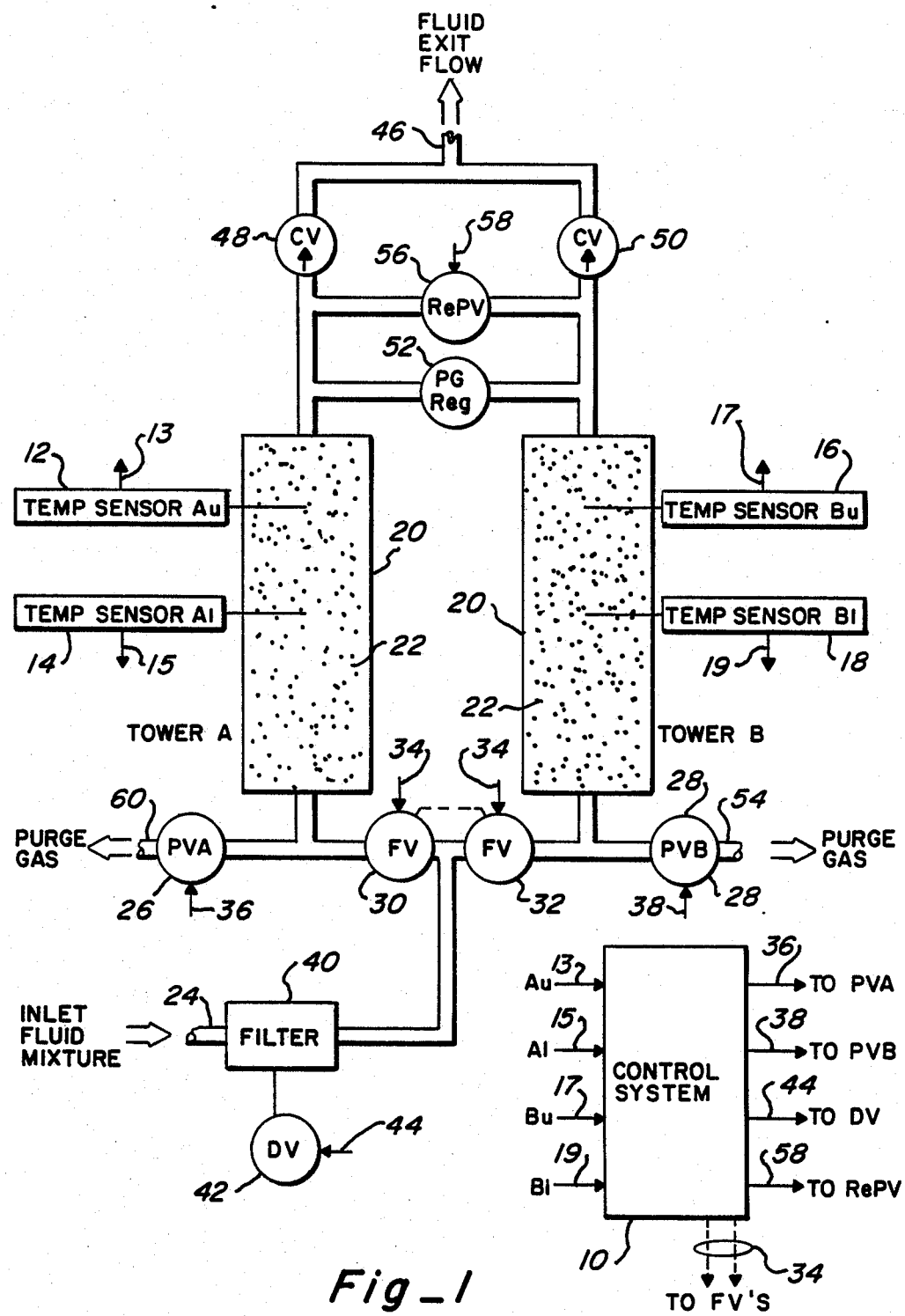
Fig_1

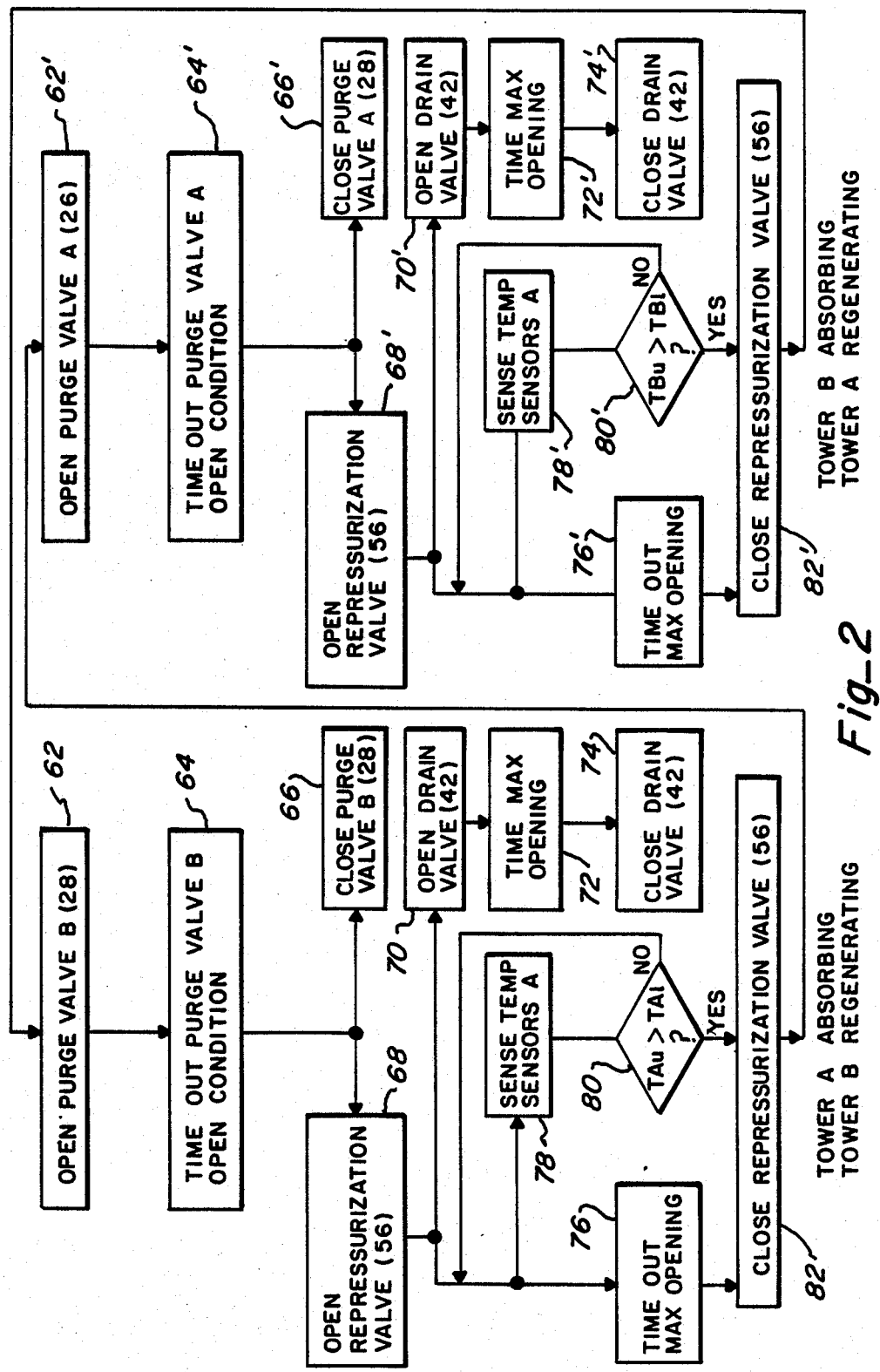
Fig_2

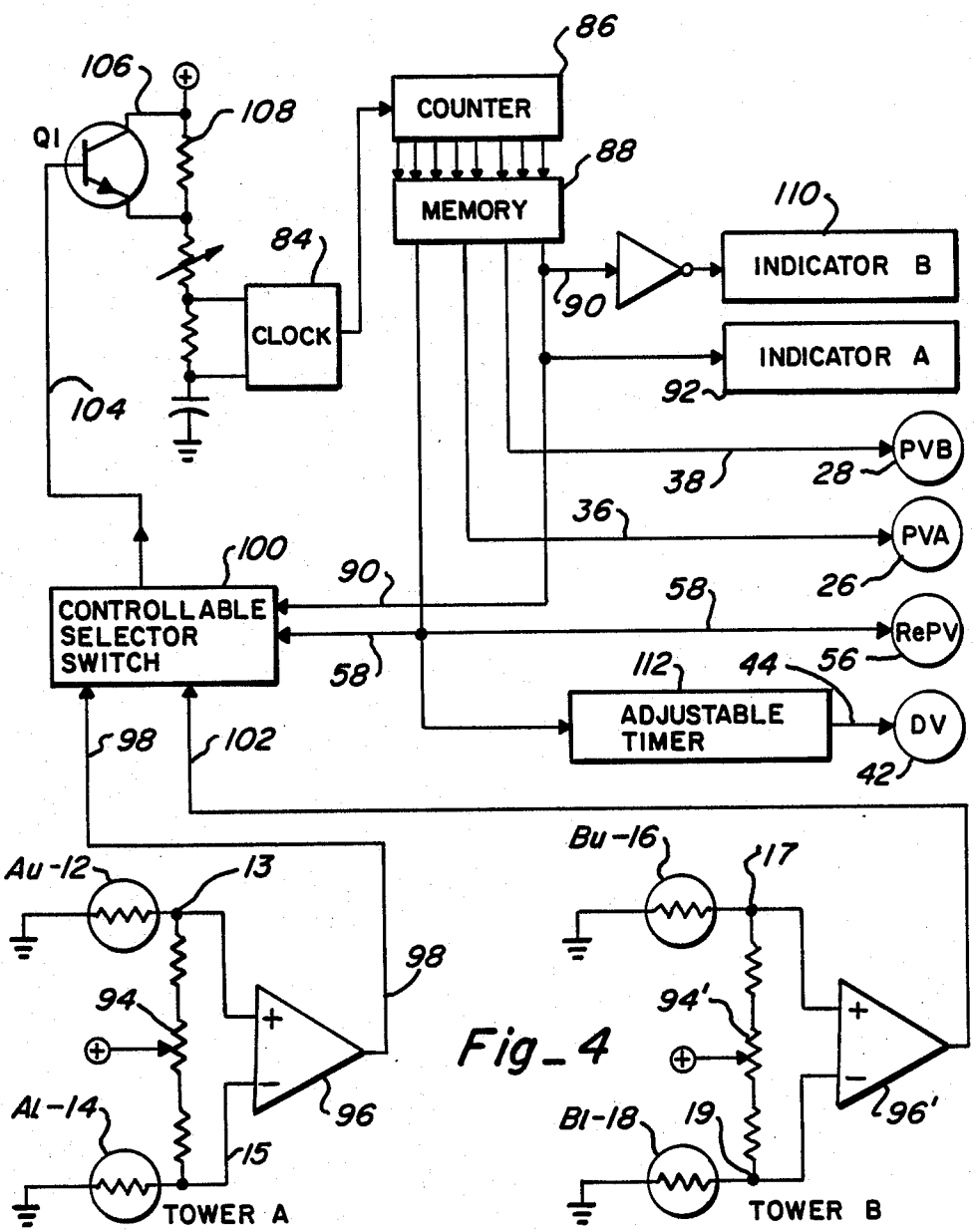

4,816,043

ADSORPTION-DESORPTION FLUID FRACTIONATION WITH CYCLE PHASE SWITCHING CONTROLLED BY PURGE AND SATURATION FRONT CONDITIONS

FIELD OF THE INVENTION

The present invention relates to the selective separation or fractionation of components from a fluid or gas mixture, for example, water from a pressurized air stream. More particularly, the present invention relates to controlling the alternating adsorption and desorption cycle phases of a twin tower fractionation apparatus in response to a predetermined purge time, the advancement of the saturation front through the dessicant bed, and maximum time constraints.

The present invention is related to inventions pertaining to twin tower gas fractionation apparatus disclosed in copending application Ser. No. 590,013, filed Mar. 15, 1984, now U.S. Pat. No. 4,559,065, for "Twin Tower Gas Fractionation Apparatus" and copending application Ser. No. 752,098, filed July 5, 1985 as a continuation of application Ser. No. 590,348, filed Mar. 16, 1984 (now abandoned), which patent and applications are assigned to the assignee of the present application. The disclosure of said patent and applications is incorporated herein by this reference.

BACKGROUND OF THE INVENTION

One of the primary uses for fractionation apparatus is to remove moisture from water vapor, although the fractionation process can be applied to separating many oher fluid components from fluid or gas mixtures. Fractionating apparatus utilize an adsorbent or dessicant bed which adsorbs the desired component from the flow of the fluid mixture passed through the dessicant bed, leaving only a processed fluid free of the adsorbed component to exit the fractionation apparatus. Once the adsorbing capacity of the dessicant bed has been reached, it is necessary to regenerate the dessicant bed by purging it of the adsorbed component. Regenerating the dessicant bed by purging it of the adsorbed component readies or renews the dessicant for renewed adsorption.

A "twin tower" fractionating apparatus is quite commonly employed to obtain the capacity for continuous adsorption of the desired component from a continual stream or flow of the inlet gas or fluid mixture. A twin tower fractionating apparatus uses two separate dessicant beds, each of which is arranged in its own fractionating tower. The inlet mixture is directed through a first one of the dessicant beds to adsorb a predetermined component in an adsorbing phase, while the other or second dessicant bed is regenerated by purging it of the adsorbed component in a desorbing phase. Once the second bed is regenerated and before the first bed has become totally saturated with the adsorbed component, the inlet mixture is switched to flow through the second bed in the other tower. While the mixture is flowing through the second bed in an adsorbing phase, the first dessicant bed is regenerated during a desorbing phase by purging it of the previously adsorbed component. The inlet mixture is switched back and forth between the two dessicant beds and the two separate fractionating towers in this manner to create an alternating cyclic operation. One bed is in an adsorbing phase while the other bed is in a desorbing phase, and the phase conditions of the two dessicant beds in the twin tower apparatus are respectively opposite of one another. This cyclic operation provides a continuous flow of the processed exit fluid which is free of the adsorbed component.

Regenerating the adsorbent bed can be achieved by changing the pressure ambient to the bed, changing the temperature of the bed, changing the concentration of the adsorbed component in the gas phase surrounding the bed, or by combining these approaches. One of the most common regenerating techniques is to bleed a small portion of the processed exit gas flow from the adsorbing tower at a low pressure and flow rate back and in the reverse or counterflow direction through the other dessicant bed. Since the processed exit gas is free of the adsorbed component, the low pressure, low rate of counter flowing gas becomes a purge gas which takes up the adsorbed component and thus regenerates the bed. The purge gas which has taken up the adsorbed component is thereafter discharged from the fractionation apparatus as waste.

The most common approach to controlling the alternation between the adsorption and regeneration phases is a simple timing cycle technique. The maximum amount of time for adsorption is selected, and the phase alternation or switching occurs at each of these time intervals. Controlling the switching based on a predetermined phase timing schedule usually offers reliability of operation due to the relatively simplistic nature of the control system. The simplicity of the pure timing control system creates certain drawbacks, however. For example, should the flow rate of the inlet mixture increase, or should the percentage of the component to be adsorbed in the mixture increase, the dessicant bed may become saturated before the phase timing interval lapses and switching occurs. Once the dessicant bed is fully saturated, it is ineffective to adsorb any more of the desired component. In this condition, known as "crashing," the exit fluid flow from the saturated bed carries the component desired to be adsorbed. This, of course, is contrary to the purpose sought to be achieved by fractionation and results in a breakdown of the desired operation.

To avoid the likelihood of saturating the dessicant bed prior to switching, the phase cycling time is usually adjusted to be conservatively short, thereby achieving some degree of assurance against crashing. The disadvantage of short phase cycle times is that it increases the frequency and thus the number of adsorption-desorption cycles which the dessicant bed must undergo. The lifetime of the dessicant is inversely related to the number of adsorption-desorption cycles it must undergo. Once the dessicant has become relatively non-adsorbent after repeated adsorption-desorption cycles, it is necessary to replace the dessicant in the fractionating tower. Failing to maximumly utilize the full capacity of the dessicant prior to cycling it into regeneration thus results in inefficient utilization and increased costs per given volume of exit fluid which has been processed.

Another drawback to the fixed cycle time operation is that it is usually wasteful. Since a percentage (usually about 13%) of the volume of the processed exit gas flow is used to create the purge gas flow during regeneration, the net yield of processed gas is less than the maximum amount of gas processed by an amount equal to the purge gas volume. With fixed phase time cycling, the purge gas flow usually occurs continually throughout the whole adsorption phase, even after the dessicant bed has been fully desorbed. Energy is thus unnecessarily consumed by processing the excessive purge gas which is lost as waste.

Variable cycle time control systems have also been devised to avoid many of the deficiencies common to fixed cycle time control systems. Complex variable cycle time controllers typically employ sophisticated and technically intricate microprocessors and multiple variable sensors. Such systems commonly obtain data relating to the inlet gas flow rate, pressure and temperature; the purge gas inlet and exhaust pressures and temperatures; the exit gas pressure and temperature; and the dew point of the exit gas. By sensing these variables, operating limits are established to optimally control the fractionation. Of course, the disadvantages to such elaborate control systems are higher costs and greater difficulties in servicing and maintaining such systems.

More moderate in complexity, variable cycle time control systems have met with some success. The theory behind such moderate variable cycle time control systems is to sense a few important fractionation variables and to modify the phase cycle times to obtain some of the advantages of a fully variable cycle time operation but with considerably less complexity and cost in the control system.

Among the control theories practiced by such moderate variable cycle time control systems is that of sensing the saturation front as it moves through a particular preselected location in the dessicant bed. Cycle alternation is automatically switched when the saturation front reaches this predetermined location. To sense the saturation front, electrical conductivity and capacitance sensors are frequently located in the dessicant bed at the predetermined location. When the saturation front contacts the sensors, either the electrical conductivity or the capacitance is modified by the interaction with the saturation front. Problems with conductivity and capacitance sensors have occurred because of the effects of corrosion and foreign particles on the sensors over prolonged periods of time, thus reducing the system performance. Dew point sensors have also been used to control cycle times. Dew point sensors have been placed in the exit gas outlet, but dew point sensors give unreliable or faulty readings under certain common conditions of fluctuations in the gas flow rates. Temperature sensors have also been employed. The temperature sensors have been placed in the dessicant beds to sense certain adsorption conditions, since heat is liberated when adsorption occurs.

Some variable cycle control systems also adjust the purge gas flow rate and the regeneration time to fit the degree of adsorption which has occurred immediately previously during the adsorption phase of the dessicant bed. Still other variable cycle control systems create different times for regeneration of one bed compared to the time allowed for adsorption of the other bed at simultaneous points in the cyclic operation of a twin tower fractionation apparatus. All of these various different control arrangements obtain some type of theoretical advantage. However, all variable control systems involve compromises in cost, efficiency, maintenance and convenience of use.

SUMMARY OF THE INVENTION

The present invention is for a new and improved variable cycle time control system for a fractionating apparatus, preferably for a twin tower fractionator. The control system of the present invention is relatively straightforward and inexpensive, it achieves relatively efficient adsorption-desorption performance without excessive waste or lost energy, and it effectively utilizes the substantial adsorption capacity of the dessicant bed to prolong the useable lifetime of the dessicant.

In accordance with one of the aspects of the present invention, the control system creates a predetermined regeneration time during which the purge gas desorbs one of the dessicant beds. The predetermined regeneration time is selected to obtain a desired degree of desorption. At the conclusion of the regeneration time, the supply of purge gas through the regenerated dessicant bed is terminated. The tower containing the regenerated dessicant bed is repressurized to essentially the same pressure as the processed gas exiting the adsorbing dessicant bed, to thereby facilitate the convenient switching of the inlet mixture into the tower with the regenerated dessicant bed at the commencement of the adsorption phase of the cycle for that bed. At the end of regeneration and at the commencement of repressurization, and before the inlet mixture has been conducted through the regenerated dessicant bed, the progress of the saturation front through the adsorbing dessicant bed is sensed. When the saturation front reaches a predetermined location relative to the overall length or capacity of the adsorbing dessicant bed, the inlet mixture is switched to the regenerated dessicant bed in the other tower, and the purge gas is directed into the dessicant bed which has previously adsorbed the adsorbed component. The control system controls both towers simultaneously by first desorbing one bed, terminating the purge gas flow, and then switching cycle operations only after the saturation front has reached a predetermined location in the other or adsorbing dessicant bed.

Control over the cycling in this described manner assures substantially complete or at least a predetermined degree of desorption of the dessicant bed to regenerate it. Only that required amount of processed exit gas constituting the purge gas flow is used to desorb the dessicant bed. Once the dessicant bed has been sufficiently desorbed, no additional purge gas is bled through the dessicant bed, and thus no additional amount of processed exit gas is lost as waste. Since phase cycling occurs primarily in response to the location of the saturation front in the adsorbing dessicant bed, the location of the saturation front determines a predetermined quantity of adsorbed component which must be desorbed during regeneration. The amount of processed exit gas used as purge gas can be reasonably anticipated because of the known amount of component which must be desorbed. The adsorbing dessicant bed can be allowed to adsorb a substantial quantity of the adsorbed component without premature switching. The dessicant beds can be more fully utilized with each cycle, thus reducing premature cycling and increasing the lifetime of the dessicant per given volume of processed exit gas. Sensing the location of the saturation front after achieving the desired degree of desorption during regeneration of the other bed makes it mostly unnecessary to sense, determine and calculate an elaborate variety of variables associated with the inlet mixture and exit fluid, such as the flow rates, pressures, dew points, relative percentages of components, etc., in order to obtain efficient twin tower system performance. The complexity of the present control system, its cost and the degree of effort necessary to maintain proper operation are all greatly reduced, while still achieving relatively high operating and cost efficiencies.

The present invention also teaches a new and improved technique of sensing the saturation front in a dessicant bed. In accordance with this aspect, the temperature gradient which immediately precedes the saturation front and progresses through the dessicant bed as the saturation front moves is sensed. The dessicant liberates heat (the heat of adsorption) when adsorption occurs. Once a given volume of dessicant has become saturated with the adsorbed component, it is incapable of further adsorbing any more of the component and thus is incapable of liberating any heat. The saturated dessicant quickly assumes the temperature of the supplied inlet mixture flowing around it. In the common upflow fractionation tower, the lower portions of the dessicant bed become saturated before the upper portions. Once saturated, the bottom dessicant bed portions are quickly cooled to approximately the temperature of the inlet gas mixture which flows past the lower saturated dessicant bed portions in the flow path to the upper unsaturated dessicant bed portions. The unsaturated dessicant above or in front of the advancing saturation front is heated by the liberated heat of adsorption to a temperature greater than the temperature of the saturated dessicant immediately following the saturation front. The temperature gradient thus immediately proceeds the saturation front.

To sense the temperature gradient, a pair of spaced apart temperature sensors or transducers, e.g., thermocouples, are positioned at a predetermined location in a predetermined spaced apart relationship in the path along which the saturation front moves. When the saturation front moves past the first temperature sensor encountered, the first temperature sensor becomes cooled while the second temperature sensor is heated by the liberated heat of adsorption which immediately precedes the saturation front. The temperature gradient associated with the advancing saturation front is reliably and quickly sensed by comparing the signals from the two sensors. When a predetermined signal level difference exists, indicating the second sensor is experiencing a predetermined greater temperature than the first sensor, the saturation front is detected by sensing the temperature gradient associated with it. The temperature sensors are usually not as prone to malfunction due to corrosion, foreign particles and other adverse influences, as are capacitance and conductivity sensors, for example. By locating the pair of temperature gradient sensing transducers at a predetermined location in the tower and along the path which the saturation front advances in the dessicant bed, the degree of saturation of the adsorbing dessicant bed as a whole is reliably monitored. This predetermined location is selected to prevent the saturation front from breaking through the terminal end of the dessicant bed and terminating further fractionation due to crashing.

The present invention also provides a new and improved control system for a twin tower fractionating apparatus of a relatively noncomplex nature which operatively guards against crashing of the fractionating apparatus under conditions of very low or minimal inlet fluid mixture flow rates. Sensing or locating the advancement of the saturation front under low flow rate inlet fluid mixture conditions can be very difficult or impossible because the temperature gradient is very small. The relatively low liberated heat of adsorption may be rapidly dissipated to the adjoining and desorbing dessicant bed of the other tower or to the ambient environment so that a minimal or nondetectable temperature gradient exists. In the present control system, a maximum extended time for adsorption is allowed in which the temperature gradient sensors can signal the arrival of the temperature gradient associated with the saturation front. If the sensors do not signal the arrival of the saturation front within this maximum extended time, the inlet mixture is switched to the regenerated dessicant bed regardless of any signals from the temperature sensors. The maximum time for extending the adsorption phase is predetermined, usually empirically, for those low flow rates of the inlet fluid mixture under which the saturation front condition cannot be reliably detected by the temperature gradient transducers.

The invention is more completely defined by the claims following the detailed description of the preferred embodiment. A more complete understanding of the various aspects of the invention, including its improvements and advantages, can be obtained from the following detailed description taken in conjunction with the accompanying drawings.

BRIEF DESCRIPTION OF THE DRAWINGS

FIG. 1 is a simplified diagram of an exemplary twin tower fractionating apparatus and a control system of the present invention shown in schematic mechanical form and in block diagram form.

FIG. 2 is a flow chart of the operations of the fractionating apparatus shown in FIG. 1 obtained as a result of the control system of the present invention.

FIGS. 3A, 3B, 3C and 3D are on-off waveform diagrams on a common time axis of functions of the fractionating apparatus shown in FIG. 1 operated as shown in FIG. 2.

FIG. 4 is an electrical schematic diagram of a preferred embodiment of the control system of the present invention shown in FIG. 1.

DETAILED DESCRIPTION OF PREFERRED EMBODIMENT

The control system of the present invention is shown in FIG. 1 in association with an exemplary twin tower fractionating apparatus. The control system is referenced 10 and includes an upper temperature sensor 12 (also referenced Au) and a lower temperature sensor 14 (also referenced Al) which are located at a predetermined position in Tower A of the fractionating apparatus. The control system 10 also includes an upper temperature sensor 16 (also referenced Bu) and a lower temperature sensor 18 (also referenced Bl) which are located at a predetermined position in Tower B of the fractionating apparatus. Each temperature sensor 12, 14, 16 and 18 is typical, for example, a thermocouple. Each temperature sensor serves as means for providing signals at 13, 15, 17 and 19 which are related to the temperatures experienced by each of the sensors 12, 14, 16 and 18, respectively.

Tower A and Tower B each define a chamber 20 which is filled with a conventional dessicant 22 of a predetermined type for adsorbing a predetermined component from an inlet supply of a fluid mixture applied at an inlet conduit 24. The inlet fluid mixture includes the predetermined component to be adsorbed, usually in liquid form, and other components usually in a gaseous form. In the conventional manner, the inlet fluid mixture is alternately switched or directed upwardly through each tower chamber 20 and the bed of dessicant 22 therein during the adsorption phase. The bottom of the dessicant bed begins adsorbing the predetermined component from the inlet fluid mixture where the inlet fluid mixture first contacts the dessicant bed. During adsorption, the dessicant releases the heat of adsorption at the point of adsorption. The dessicant at the lowermost points of the bed continues to adsorb until it becomes saturated with the adsorbed component, at which time it can no longer adsorb any more of the component. Once saturated, the dessicant at that level can no longer release the heat of adsorption and the dessicant rapidly cools to the temperature of the inlet fluid mixture.

The dessicant at any given level in the bed is fully effective to adsorb the predetermined component from the inlet flow mixture passing over the dessicant, until the dessicant at that level becomes saturated. Consequently, the saturation points progress as a level or front moving upward from the bottom of the chamber 20 and dessicant bed 22 toward the top of the chamber and dessicant bed. The saturation front is preceded by an elevated temperature caused by the released heat of adsorption. The elevated temperature moves slightly in advance of the saturation front. The temperature of the saturated dessicant bed slightly behind or below the saturation front is quickly reduced to approximately the temperature of the inlet fluid mixture due to the cooling effect of the inlet mixture flowing through the dessicant bed. Thus, the temperature gradient which immediately precedes the saturation front characterizes and identifies the saturation front as it moves upward through the dessicant bed, at all flow rates except very low flow rates.

The control system 10 operatively controls the operation of the fractionating apparatus in relation to the progress and location of the saturation front as it moves through each Tower A and B. Each pair of temperature sensors, 12 and 14 in Tower A and 16 and 18 in Tower B, are exemplary means for sensing the temperature gradient which immediately precedes the saturation front. Each pair of temperature sensors is also exemplary of means for sensing the location of the saturation front in each dessicant bed and tower. When the upper temperature sensor Au or Bu (12 or 16, respectively) experiences a temperature which is of a predetermined amount greater than the temperature experienced by the associated lower temperature sensor Al or Bl (14 or 18, respectively) the temperature gradient caused by the advancing saturation front is detected.

The temperature sensors 12 and 14 in Tower A and 16 and 18 in Tower B are located at a predetermined physical location along the path of advancement of the saturation front in each dessicant bed. Each pair of temperature gradient sensors is located at the predetermined position in each dessicant bed to sense the location of the saturation front before the saturation front breaks through the top of the dessicant bed and the fractionation apparatus crashes. A margin of safety against crashing is provided by locating the temperature gradient sensing sensors below the absolute top of the dessicant bed. The distance below the absolute top of the dessicant bed is determined empirically according to the type of inlet fluid mixture, the adsorption capability and response characteristics of the dessicant, and the lifetime of the dessicant, among other things. The dew point is lowered as the sensors are placed more towards the bottom of the dessicant bed.

The flow of the inlet fluid mixture into the dessicant beds of the Towers A and B is controlled by opening and closing purge valves A and B (26 and 28, respectively). The purge valves 26 and 28 control the condition of flow valves 30 and 32. The flow valves 30 and 32 are preferably mechanically interconnected to operate as differential pressure shuttle valves, but in other embodiments could also be directly and individually controlled by control signals supplied at 34 from the control system 10. Purge valve A (26) and purge valve B (28) are normally closed valves which open upon the application of a purge valve control signal applied at 36 or 38 respectively from the control system 10. A pressurized supply of the inlet fluid mixture is applied to the inlet conduit 24 from a source which is not shown. The inlet fluid mixture first encounters a filter 40 which removes any entrained vapors or aerosol particles in the inlet fluid mixture. A normally closed drain valve 42 is periodically opened to remove the accumulated fluid in the filter 40. The control system 10 supplies a drain valve control signal at 44 to control the opening of the drain valve. The pressure from the inlet fluid mixture within the filter 40 forces the accumulated fluid out of the filter 40 through the open drain valve 42.

The inlet fluid mixture from the filter 40 is diverted to one or the other of the Towers A or B by the flow valves 30 and 32. In the case of differential pressure responsive flow valves, the opening and closing of the flow valves 30 and 32 is controlled by opening and closing the purge valves 26 and 28. To open the flow valve 30 and to close flow valve 32, purge valve B (28) is opened. The substantial pressure differential across flow valve 32 closes it and the mechanically interconnected flow valve 30 is opened. The inlet fluid mixture from the filter 40 is diverted through the open flow valve 30 and is admitted into the bottom of the container 20 and dessicant bed 22 of Tower A. During the time that purge valve B (28) is open, purge valve A (26) remains closed, thus forcing the inlet fluid mixture into the bottom of the dessicant bed in Tower A. To divert the inlet fluid mixture into Tower B, the opposite valve condition exists: purge valve A (26) is opened, thus closing flow valve 30 and opening flow valve 32. Purge valve B (28) is closed when purge valve A (26) opens.

The processed fluid or gas flow exiting each of the towers, which is substantially devoid of the adsorbed component, is conducted from the top of each tower container 20 to an exit conduit 46. Check valve 48 is connected in series between the upper outlet from the Tower A container and the exit conduit 46, and check valve 50 is connected in series between the upper outlet from the Tower B container and the exit conduit 46. The check valves 48 and 50 assure that the exiting flow of processed gas from each tower flows out of the exit conduit 46 and not backwards through the other check valve into the top of the other tower.

To regenerate one dessicant bed, a relatively small percentage of the processed exit fluid is bled back as a regenerating purge gas or fluid to the tower undergoing regeneration. The pressure and flow rate of the purge gas is controlled by a two-way purge gas regulator 52. The flow path of purge gas through the tower undergoing regeneration is also established by the open purge valve 26 or 28. For example, assume that Tower A is adsorbing while Tower B is regenerating. Purge valve B (28) is open. The flow of purge gas from the regulator 52 is directed into the top of the Tower B container and flows in a reverse or downward direction through the dessicant bed. The purge gas picks up the adsorbed component from the Tower B dessicant bed and thus regenerates or desorbs the Tower B dessicant bed. The purge gas with the adsorbed component flows out of conduit 54 from the open purge valve B (28). Since a pressure drop occurs across the regulator 52, the pressure of the purge gas entering the top of the Tower B dessicant bed is substantially less than the pressure of the processed exit gas in conduit 46, so check valve 50 remains closed.

The extent of regeneration is controlled by the time duration during which the purge valve remains open. Since the purge gas leaves the regulator 52 at a predetermined pressure and flow rate, the extent of regeneration can be very precisely controlled by opening the purge valve for a predetermined maximum time necessary to regenerate a fully saturated dessicant bed or a dessicant bed which has been saturated to the extent determined by detecting the advancing saturation front. With the degree of saturation of the dessicant bed established by detecting the advancing saturation front by the temperature gradient sensors, the length of time during which purge gas must flow to regenerate the dessicant bed can be established very accurately. Full regeneration can be achieved without excessive loss of purge gas as waste.

At the termination of the predetermined time period allowed for regeneration, the purge valve control signal at 38 from the control system 10 causes the purge valve B (28) to close. Since switching of the flow condition of the flow valves 30 and 32 will occur thereafter, to divert the inlet fluid mixture into the regenerated bed, it is desirable to pressurize the regenerated tower to essentially the pressure of the processed exit gas. A normally closed repressurization valve 56 is opened by a repressurization signal at 58 supplied by the control system 10 for a predetermined relatively short time period. The pressure within the tower which has previously undergone regeneration quickly reaches the pressure of the processed exit gas. Repressurization makes switching the condition of pressure sensitive flow valves 30 and 32 easier because a significant pressure differential exists when the other purge valve opens, thus quickly changing the condition of flow valves 30 and 32.

In fractionating apparatus which do not employ differential pressure flow valves 30 and 32, but instead use positive control flow valves, the repressurization valve 56 may be dispensed with. Also, use of the repressurization valve 56 may be avoided if the purge gas flow is sufficiently short in time duration relative to the length in time of the adsorption phase of the other tower, because the regenerated tower will eventually repressurize as a result of the flow through the regulator 52 after the purge valve has closed at the termination of regeneration.

The opposite situation exists when Tower A is regenerated. Purge valve A (26) is opened by a purge valve signal 36 from the control system 10. The flow valves 30 and 32 divert the inlet fluid mixture into Tower B. Purge gas flows through the regulator 52 in the reverse direction to desorb and thus regenerate the dessicant in Tower A. The purge gas containing the adsorbed component which has been taken up during regeneration is discharged from purge valve A through an exit conduit 60 as waste. When regeneration is complete, purge valve A closes and then repressurization valve 56 opens. The alternating cyclic operation continues indefinitely in the manner described to provide a continuous flow of processed exit gas from the exit conduit 56.

The nature of the control over the fractionating apparatus by the control system 10 is illustrated by the flow chart shown in FIG. 2. Although the description of the status of the fractionating apparatus could commence at any point in the continuous cyclic operation, the description herein begins with the steps or operations when Tower A is adsorbing and Tower B is regenerated. In describing FIG. 2, each operative condition or step in the overall adsorption-desorption cycle is designated by a referenced numeral. Timing diagrams showing the relative onset, termination and extent of these operative conditions are illustrated in FIGS. 3A, 3B, 3C and 3D. The control system and its various components serve as means for operatively controlling the fractionating apparatus and its components to achieve the functions and operations next described.

As shown at 62 in FIG. 2, the adsorption phase in Tower A and the desorption phase in Tower B begins at time $t_0$ (FIG. 3A) by opening purge valve B (28 in FIG. 1). Desorbing or regeneration continues for a predetermined time calculated to sufficiently fully regenerate the dessicant bed of Tower B. After the predetermined time for desorption period has lapsed, as shown at 64 in FIG. 2 and at time $t_1$ in FIG. 3B, the purge valve B closes, as shown at 66, thus terminating the regeneration of Tower B. The predetermined time duration during which desorption occurred is defined by the time period $t_1$ minus $t_0$, or $(t_1 - t_0)$, as shown in FIG. 3B. Simultaneously with the closing of purge valve B at 66 in FIG. 2, the repressurization valve (56 in FIG. 1) is opened, as is shown at 68 in FIG. 2 and by FIG. 3C.

After the repressurization valve is opened at 68, as shown in FIG. 2, the drain valve (42 in FIG. 1) is opened at 70 for a predetermined time period established at 72 and then closed at 74. FIG. 3D shows the momentary opening of the drain valve at time $t_1$ and its closing at time $t_2$, thereby remaining open for the time duration $t_2$ minus $t_1$. A timing step commences as shown at 76 in FIG. 2. The maximum allowable time during which the adsorption phase can extend is determined at 76. This maximum time period for adsorption is shown by dashed lines in FIG. 3A. Since the adsorption phase of the cycle shown in FIG. 3A is established by the purge cycle duration shown in FIG. 3B, plus the added time during which the repressurization valve remains open after the purge valve closes, as shown in FIG. 3C, the maximum extended time period for adsorption is also shown by dashed lines in FIG. 3C. The maximum time period for extending the open time of the repressurization valve is measured between $t_2$ and $t_4$. The maximum time period allowed for adsorption is measured between $t_1$ and $t_4$. The maximum time period allowed for adsorption is measured between $t_0$ and $t_4$.

The maximum extended time period for adsorption only comes into play when the temperature gradient associated with the advancing saturation front is not detected by the temperature sensors (12 and 14 shown in FIG. 1). At the same time that the drain valve opens (70 in FIG. 2 and $t_1$ in FIG. 3D), and at the same time that the maximum extended time begins being timed (76 in FIG. 2 and $t_1$ in FIG. 3C), the control system commences sensing the temperature signals at 13 and 15 supplied by the temperature sensors 12 and 14 respectively, as shown in FIG. 1. This step is shown at 78 in FIG. 2. When the temperature gradient associated with the advancing saturation front is detected as a result of the temperature sensor Au (12 in FIG. 1) sensing a predetermined greater temperature than the temperature sensed by sensor Al (14 in FIG. 1) as shown as 80 in FIG. 2, the repressurization valve (56 in FIG. 1) is closed as shown at 82 and at $t_3$ in FIG. 3C.

Until the temperature gradient is sensed, the control system continues to examine the temperature sensor signals to detect the temperature gradient as is illustrated by the continuous control loop provided by the decisional function illustrated at 80 in FIG. 2. If the temperature gradient is not detected before the maximum allowable extended time for repressurization occurs, at 76, the repressurization valve will close at 82 as a result of the timing function occurring at 76.

Normally, the temperature gradient sensed at time $t_3$ as shown in FIG. 3C will occur before the maximum allowable extended time period for adsorption occurs at time $t_4$. Thus, the adsorption phase will usually terminate at time $t_3$, and time $t_3$ will be usually located between times $t_l$ and $t_4$. The time $t_3$ represents the time when the saturation front reaches the predetermined location in the dessicant bed where the pair of temperature gradient sensing transducers are located.

Of course, once the adsorption phase of the cycle terminates in Tower A, adsorption commences in Tower B by opening purge valve A shown at 62′ in FIG. 2. The process for the alternate tower conditions, i.e., Tower B adsorbing and Tower A regenerating, is shown in FIG. 2 as exactly the same series of steps as has previously been described for the situation of Tower A adsorbing and Tower B regenerating. The steps for Tower B adsorbing and Tower A regenerating are distinguished by primed reference numerals, but are otherwise as have been explained. The timing diagrams of FIGS. 3A, 3B, 3C and 3D are also applicable to either Tower cycle phase condition.

In fractionating apparatus which does not employ a repressurization valve, the control system of the present invention is equally applicable. The steps of determining the arrival of the saturation front at the predetermined location simply commence after the termination of regeneration.

A number of significant advantages and improvements result from the control system of the present invention. The usable lifetime of the dessicant is increased, because the number of adsorption-desorption reversals of the dessicant is reduced by more completely utilizing the full adsorbing capacity of the dessicant bed in each adsorption phase. More complete utilization of the dessicant bed capacity is possible as a result of detecting the saturation front before it breaks through the dessicant bed. Increased lifetimes of the dessicant result, compared to prior art arrangements which do not fully and consistently utilize the full capacity of the dessicant bed. Another advantage is that the amount of purge gas which is lost as waste is reduced. After desorption of the dessicant bed the flow of purge gas is terminated. Since the maximum saturation conditions of the bed are established by sensing the location of the saturation front, the amount of purge gas necessary to desorb the bed can be accurately correlated to the saturation conditions and therefore limited accordingly. Even under low flow rates, by limiting the maximum allowable time period during which adsorption can occur, crashing of the system is avoided.

Although the system control previously described could be achieved by a number of different techniques, one particularly advantageous and improved circuit arrangement for achieving the control system functions is illustrated in FIG. 4. A conventional clock 84 supplies digital clock pulses to a conventional eight bit counter 86. Output signals are supplied by the counter 86 to the input address terminals of a conventional memory 88. The output signals of the counter 86 represent the count of clock pulses supplied by the clock 84. At each particular memory address location in the memory 88, a preestablished signal has been recorded. Since the pulses from the clock 84 occur at predetermined regular intervals, the locations addressed by the signals from the counter 86 and memory 88 are accessed in order to create the timing signals illustrated in FIGS. 3A, 3B, and 3C.

For example, assume at the first memory location addressed that Tower A is switched to an adsorbing condition by opening purge valve B (28) by delivering the control signal at 38. Simultaneously, a signal at conductor 90 is applied to an indicator 92 to signal that Tower A is adsorbing. The signal 38 remains high during the sequential addressing of memory locations which all have high signals recorded therein, until the memory address is encountered which corresponds to time tl in FIG. 3B. At that address location a low signal is recorded and signal 38 is removed and purge valve B (28) closes. Simultaneously, the signal at 58 is delivered to the repressurization valve 56, which opens and remains open until the end of the adsorption cycle established by the temperature sensing gradient transducers or until the expiration of the maximum allowable extended period for desorption.

Whether the temperature gradient transducers will operatively terminate the adsorption phase in Tower A, or whether the maximum allowable extended period will terminate the adsorption phase, is determined by the temperature experienced by the temperature sensors 12 and 14 which take the form of conventional thermistors. The upper temperature thermistor Au (12) and the lower temperature sensor thermistor Al (14) are connected by a biasing network 94 including a potentiometer connected to a source of voltage potential. The adjustment of the potentiometer 94 establishes an offset voltage with respect to each thermistor 12 and 14. This offset voltage establishes the level of signals which are compared by a conventional differential amplifier 96 connected as a comparator. A signal from the comparator 96 is delivered by a conductor 98 to a controllable selector switch 100 when the upper thermister Au experiences a predetermined greater temperature than the lower thermistor Al. The degree of temperature gradient necessary to trigger the comparator 96 to supply the signal on conductor 98 to the selector switch 100 is established by means of the potentiometer 94 and biasing network. The signals at 90 and at 58 are received by conventional gates of a conventional controllable selector switch 100 to operatively select which of the input conductors 98 and 102 is to be conducted to an output conductor 104. The gating in the controllable selector switch 100 is such that when adsorption is occurring in Tower A, the signal on conductor 98 is conducted to conductor 104 and when adsorption is occurring in Tower B, the signal on conductor 102 is conducted to conductor 104. Thus, in the tower undergoing adsorption, a signal will appear on conductor 104 when the saturation front reaches the predetermined location of the temperature gradient sensing transducers.

When the saturation front condition is detected by the thermistors in either tower, a high signal is applied to the base of transistor 106. Resistor 108 is essentially shorted by the conducting transistor 106. The voltage supplied to the clook 84 increases and the clock 84 begins to run considerably more rapidly than its normal pace. The advancement of the counter 86 is therefore accelerated and the time during which adsorption and the repressurization signal 56 occur is rapidly thereafter terminated because the memory locations are more rapidly addressed. On the other hand, if the saturation front is not detected, the transistor 106 remains nonconductive and the clock 84 continues at its normal pace. At the end of the predetermined maximum allowable time for extending the repressurization and adsorption cycles as established by signals recorded in memory locations, the signals at 90 and 56 terminate.

Thereafter, adsorption commences in the other tower, Tower B, and similar operation occurs as has been previously described. Differences are that the indicator 110 signals that adsorption is occurring in Tower B, and the signals at 90 and 58 cause the controllable selector switch to apply the input signal on conductor 102 to the conductor 104. The temperature sensors in Tower B, Bu or 16 and Bl or 18, function in exactly the same manner as has been previously described with respect to the temperature sensors in Tower A. The biasing network and potentiometer 94' and the comparator 96' operate in the same manner as has been previously described with respect to the elements 94 and 96.

To open the drain valve 42, the signal at 58 is applied to an adjustable timer 112. The adjustable timer delivers a signal at 44 to the drain valve to open it for a predetermined relatively short period of time after the signal at 58 is applied.

The circuit arrangement as shown in FIG. 4 offers significant advantages in simplicity and hence reliability. The digital circuit elements illustrated are relatively inexpensive and are reliable in operation. Microcomputers or microprocessors with elaborate operating programs are avoided. Overall operation retains the reliability of digital equipment.

Although the present invention has been described with a certain degree of particularity, it should be recognized that the disclosure of the preferred embodiment has been made by way of example. Changes in detail or structure of the preferred embodiment may be made without departing from the scope of the invention as defined in the appended claims.

What is claimed is:

1. In a twin tower fractionating apparatus comprising a dessicant bed in each tower, an inlet flow valve for selectively directing a supply of inlet fluid mixture into each tower and its associated dessicant bed, the inlet fluid mixture containing a predetermined component to be adsorbed by the dessicant bed during an adsorption phase of fractionation, the inlet fluid mixture becoming a processed fluid upon adsorption of the predetermined component, means for diverting a portion of the processed fluid as purge fluid, a purge valve associated with each tower and operative for directing the purge fluid through the dessicant bed associated with the tower to effect the removal of the adsorbed component from the dessicant bed during a desorption phase of fractionation, cycling means for controlling said purge valves and said inlet flow valve and operative when activated for approximately simultaneously directing the inlet fluid mixture into the dessicant bed of one tower at the commencement of the adsorption phase of the dessicant bed in the one tower and directing the purge fluid into the dessicant bed of the other tower at the commencement of the desorption phase of the dessicant bed of the other tower, and a cycle control for said fractionating apparatus, wherein the improvement comprises sensing means located at a predetermined position in the dessicant bed of each tower for sensing the temperature drop between the temperature of the saturation front in said dessicant bed and the temperature of the saturated bed and supplying a control signal to said cycling means in response to a predetermined magnitude of said temperature drop, said temperature drop sensing means comprising first sensor means for sensing the temperature of the dessicant bed at one location relative to said predetermined position, second sensor means for sensing the temperature of the dessicant bed at another downstream location, means for operatively comparing the temperatures sensed by said first and second sensor means and further operative for supplying said control signal when the temperature sensed by said ssecond sensor means exceeds the temperature sensed by said first sensor means by a predetermined amount, which amount is indicative of the difference between the increased temperature resulting from the heat of adsorption associated with the saturation front and the lower temperature resulting from the cooling of the saturated dessicant bed by the incoming inlet fluid mixture, means for terminating the flow of purge fluid into the dessicant bed in the desorption phase after the expiration of a predetermined timed purge period, and means responsive to the termination of the flow of purge fluid into the dessicant bed in the desorption phase for activating said cycling means to control said inlet flow valve upon receipt of said control signal.

2. In a fractionating apparatus as defined in claim 1, wherein said improvement further comprises means for providing a limit signal at a predetermined maximum extended time period after said cycling means is activated, and wherein said activating means is operative upon receiving one of either said control signal or said limit signal only after the termination of the flow of purge fluid into the dessicant bed in the desorption phase.

3. In a fractionating apparatus as defined in claim 2, wherein the predetermined timed purge period is fixed for each desorption phase.

4. In a fractionating apparatus as defined in claim 1, wherein said improvement further comprises:
  means for supplying clock signals at a predetermined frequency;
  means receptive of the clock signals and operative for supplying count signals related to the number of clock signals received;
  a memory having a plurality of selectively addressable memory locations with a predetermined signal level recorded in each of the addressed memory locations, said memory receiving said count signals from said count signal supplying means and addressing the memory location corresponding to said count signals, said memory operatively supplying as output signals the signal levels recorded in each memory location addressed; means receptive of said output signals from said memory means and operative for creating:
    (a) purge valve control signals to control the open and closed conditions of said two purge valves;
    (b) the predetermined timed purge period; and
    (c) a tower selector signal after the expiration of said predetermined timed purge period; and
  means receptive of said tower selector signal for supplying said control signal from said temperature drop sensing means associated with the tower in the adsorption phase to said flow valve activating means.

5. In a fractionating apparatus as defined in claim 4: wherein the improvement further comprises means receptive of the output signals from said memory and operatively creating a limit signal at a predetermined maximum extended time reference period after said cycling means directs the inlet fluid mixture into the dessicant bed of one tower and the purge fluid into the dessicant bed of the other tower for controlling said cycling means, and means receptive of said control signal for controlling said clock means to increase the frequency of the supplied clock signals to a predetermined high frequency whereby said limit signal occurs at a predetermined shortened time period thereafter.

* * * * *